United States Patent [19]
Chapman

[11] 3,989,947
[45] Nov. 2, 1976

[54] TELESCOPE CLUSTER

[75] Inventor: Arthur S. Chapman, Rolling Hills, Calif.

[73] Assignee: Hughes Aircraft Company, Culver City, Calif.

[22] Filed: Mar. 1, 1971

[21] Appl. No.: 120,019

[52] U.S. Cl. ............................... 250/338; 330/4.3; 178/6.8
[51] Int. Cl.[2] ........................................... G01J 1/00
[58] Field of Search .............. 250/83.3 H, 203, 220, 250/339, 342, 348, 338; 330/4.3; 178/6.7 R, 6.8, 7.6, 7.7; 356/152; 244/3.16

[56] References Cited
UNITED STATES PATENTS

| | | | |
|---|---|---|---|
| 3,405,269 | 10/1968 | Wood | 250/83.3 H |
| 3,508,051 | 4/1970 | Nichols et al. | 250/83.3 H |
| 3,597,617 | 8/1971 | Passaro | 250/83.3 H |
| 3,644,043 | 2/1972 | Jones et al. | 356/5 |
| 3,698,812 | 10/1972 | Nelson | 356/5 |
| 3,711,046 | 1/1973 | Barhydt et al. | 244/3.16 |
| 3,715,497 | 2/1973 | Cooper et al. | 178/6.8 |

*Primary Examiner*—Peter A. Nelson
*Attorney, Agent, or Firm*—Martin E. Gerry; William H. MacAllister, Jr.

[57] ABSTRACT

Broad, intermediate, and narrow field of view infrared telescopes, broad and narrow field of view visual telescopes, and a narrow field of view laser telescope, together with apparatus for boresighting said telescopes, all of the narrow field of view telescopes having a common objective lens with means for separating the optical pathways.

6 Claims, 12 Drawing Figures

Arthur S. Chapman,
INVENTOR.
BY.

Ernest L. Brown
ATTORNEY.

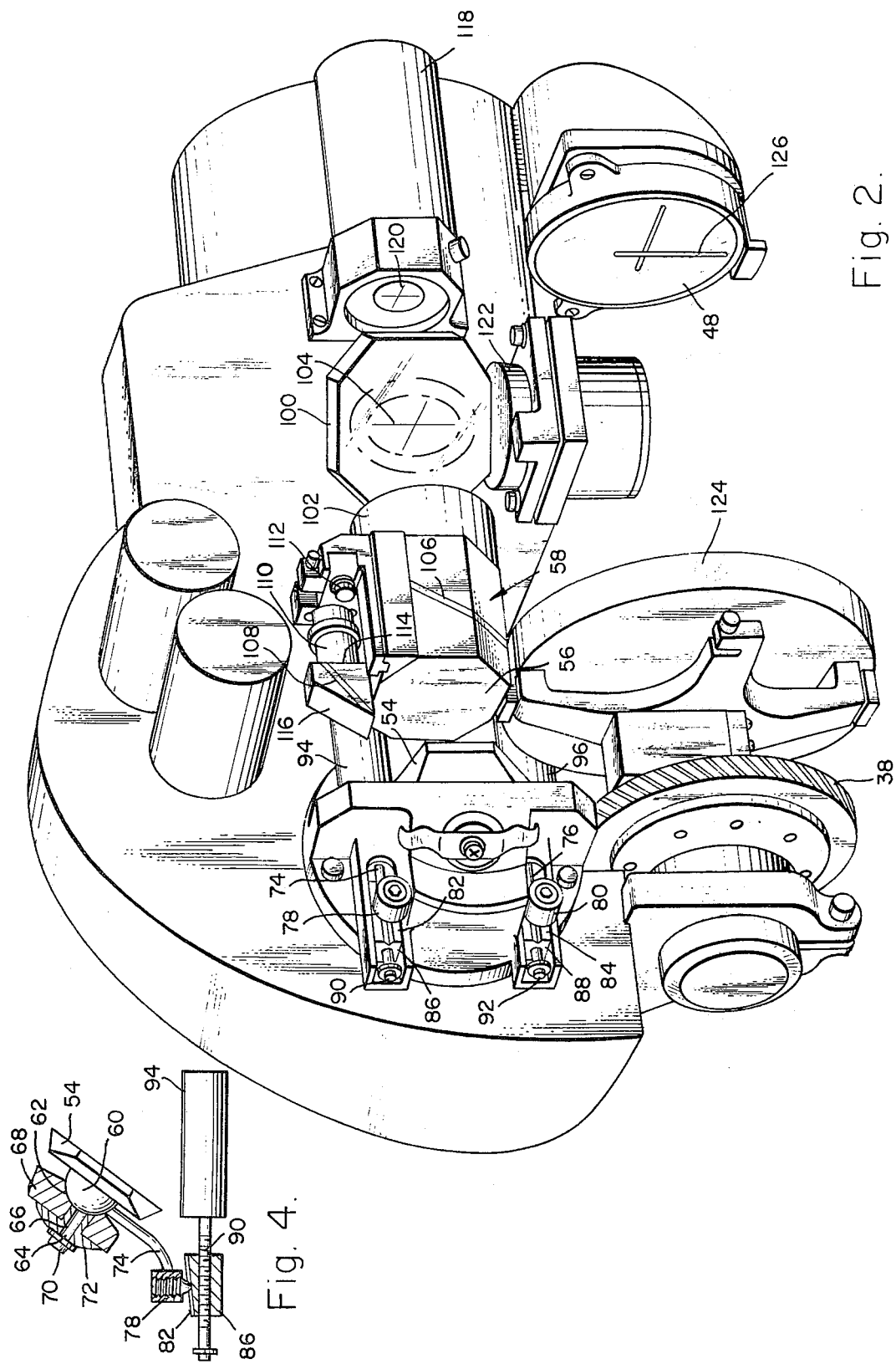

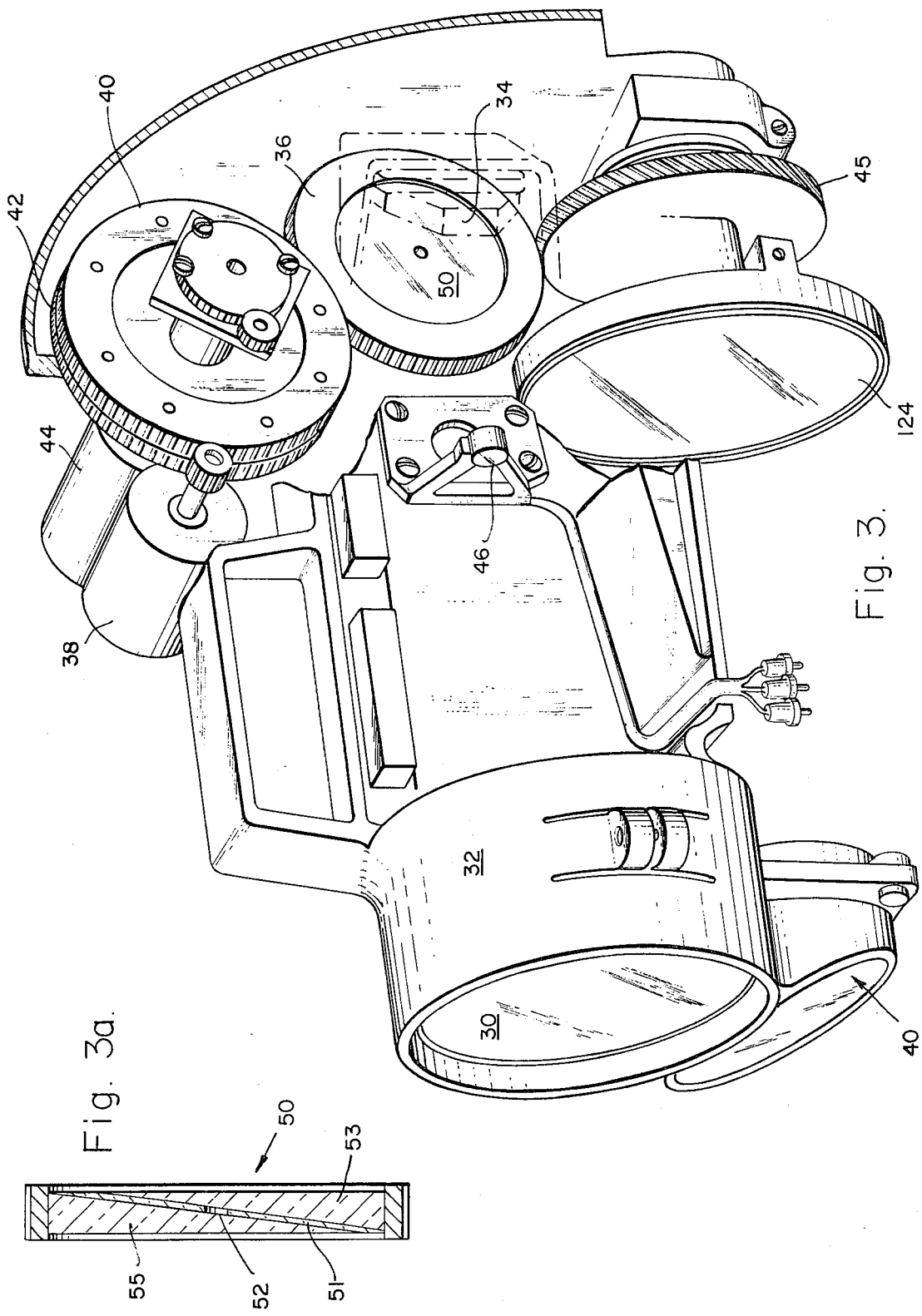

TELESCOPE CLUSTER

The invention herein described was made in the course of a contract with the Department of Defense.

DESCRIPTION OF THE PRIOR ART

This invention pertains to optical apparatus which is adapted to sense visual, infrared, and laser rays with many of the optical elements in common.

The apparatus of this invention uses visual telescopes to acquire the target, infrared telescopes to track a fired missile, and a laser telescope for sensing laser radiation.

Typically, one may be flying a missile carrying aircraft, such as a helicopter, with an optical sight for target acquisition. The missile is pointed generally toward the target and is fired. After firing, an observer on the aircraft continues to track the target with his visual sight. Infrared trackers track the fired missile, an error signal is computed and the missile is controlled or corrected to fly toward the target.

Instead of a visual sight, one might use a laser for illuminating the target. The laser illumination received at the sight could then be used to track the target. The laser could be on the ground or on the aircraft. If on the aircraft, the laser can also be used for ranging.

Prior to this invention, it was customary to have separate infrared, visual, and laser telescopes. The visual telescopes were used to point the infrared telescopes and the laser telescopes. To that end, adjustment of the telescopes was needed to align the optical axes of the various telescopes parallel so that they were looking at the same target. Such a system using separate visual and infrared telescopes is shown, for example, in U.S. Pat. No. 3,711,046 issued on an application originally filed on May 4, 1961 on behalf of Hamilton Barhydt and assigned to the same assignee on the present application. The present invention combines the separate visual and infrared optical paths of the prior art into a single optical path in order to eliminate the problem of boresight alignment while retaining or improving all other functions.

BRIEF DESCRIPTION OF THE INVENTION

The invention contemplated by this invention comprises a telescope cluster having three objective lenses. One objective lens is attached to a wide field of view telescope for receiving visual frequency radiation. This telescope may be designated an acquisition telescope. A second objective lens is used for broad field of view and intermediate field of view infrared sensing. That apparatus is shown and described in detail in U.S. Pat. Application, Ser. No. 19,374, filed Mar. 13, 1970, by Arthur S. Chapman, for a "Balanced Tiltable, Rotating Mirror With Its Optical Axis Angularly Offset From Its Axis of Rotation," which is assigned to Hughes Aircraft Company, the assignee of this invention. The third objective lens is used in common for a narrow field of view visual system, a narrow field of view infrared system, and received laser beam sensing.

The third objective lens channels radiation into a folded optical system. From the objective lens the received radiation strikes a stationary mirror which redirects the radiation at almost a right angle from the optical axis of the objective lens. To that end, the plane of the mirror is angled slightly greater than 45 degrees with the optical axis of the objective lens.

The radiation from the first stationary mirror strikes a spinning composite structure which has a substantially parallel opposing surfaces and which is transparent to visual and incident laser frequency radiation. Imbedded within the composite structure is a first dichroic mirror with its optical axis, perpendicular to its surface, slightly angled from a direction normal to the surfaces of the structure. The dichroic mirror is adapted to reflect infrared frequency radiation produced, for example, by missile and infrared frequencies produced by the boresighting laser, to be described hereinafter.

Radiation transmitted through the composite structure strikes an adjustable planar mirror which reflects received radiation substantially parallel to but offset from the optical axis of the objective lens of the narrow field of view system. The adjustable planar mirror is adjusted when the apparatus is boresighted.

The adjustable mirror is gimbaled in a ball and socket joint. The ball on the back of the mirror is held in engagement with the socket by a leaf spring. A pair of sliding members on opposing sides of the mirror wedge into the space between the mirror and the socket frame. These sliding members tilt the mirror. The sliding members are mounted to be controlled or moved by a pair of lead screw followers on lead screws which are motor driven. When the screws are driven in synchronism, the mirror tilts about one axis. When the screws are driven differentially, the mirror tilts about another axis substantially perpendicular to the first axis. Thus, by controlling the motors driving the screws, the angle of tilt of the mirror is adjusted.

The radiation reflected from the adjustable mirror is directed into one face of a multi-image prism block. A second dichroic mirror, imbedded in the prism block, allows visual light to continue straight through the block onto a reticle. Received laser and boresight laser frequency radiation is diverted toward one side. A third dichroic mirror, imbedded in the prism block, intercepts the received laser radiation and shunts it into a laser detector. The third dichroic mirror allows boresight laser radiation to be transmitted. At two of the faces of the multi-prism block are field stops. The field stop adjacent the laser detector, the field stop adjacent the boresight laser, and the visual target reticle are the same optical distance from a common point in their radiation paths. By same optical distance one means the same geometrical distance with correction for different indices of refraction in the various paths.

The broad field of view visual or acquisition telescope is assembled with its optical axis substantially aligned with the visual radiation out of the prism block. A switching mirror relays light either from the broad field of view or the narrow field of view visual telescopes into an eyepiece or relay optics leading to an eyepiece. The reticle on the prism block and the reticle on the broad field of view telescope are the same optical distance from the axis of the switching mirror.

The infrared radiation reflected from the spinning composite structure and first dichroic mirror re-strikes the first or stationary mirror from whence it is reflected onto an infrared detector which is offset from the optical axis of the objection lens.

The infrared detectors may be of the conventional L-type orthogonal detectors. The first dichroic mirror produces an optical scan onto a pair of orthogonal detectors. By measuring the time taken by the image to cross the detectors and error correction signals produced. Such measurement and computation is fully described in "Infrared System Engineering by Richard D. Hudson, Jr., John Wiley & Sons, Inc., 1969, pp 235–263, particularly pp. 255–256.

To boresight the narrow field of view system, a gallium arsenide laser produces a beam and channels it through a field stop and the third dichroic mirror, onto the second dichroic mirror where it is reflected onto the adjustable mirror. An aperture formed in the center of the rotating composite structure allows the beam to pass through the dichroic mirror. The beam is projected from the first stationary mirror onto and through the objective lens, missing the housing of the infrared detector. A corner reflector prism external to the objective lens reflects the radiation back into the objective lens, parallel to the optical axis thereof but displaced therefrom. The reflected radiation is reflected by the first stationary mirror onto the rotating first dichroic mirror where it is reflected, producing a circular pattern on the first stationary mirror which is reflected into and focused on the infrared detector. The output of the infrared detector may be used to servo the adjustable mirror, automatically to boresight the narrow field of view system. An error signal is derived from the outputs of the infrared detector, then amplified and transmitted to the motors driving the adjustment screws for the adjustable mirror.

The telescope objective lens for the wide and intermediate field of view infrared sensor is offset from the objective lens of the narrow field of view telescope. To boresight or align the optical axes of the two objective lenses, a portion of the boresighting laser radiation is channeled out of the narrow field of view objective lens into a second corner reflector prism extending between the axes of two objective lenses. The corner reflector projects boresight laser radiation onto the optical axis of the broad and intermediate field objective lens from whence its position is sensed by the broad or intermediate field of the view sensor.

When a ranging laser is used with the apparatus, it is important that the optical axis of the laser be aligned with the optical axis of the narrow field of view objective lens. A portion of the laser light is transmitted by a corner reflector from the laser into the optical axis of the narrow field of view objective lens from whence its position is sensed. When the laser light is exactly on the axis of the objective lens, the axis of the laser is parallel with the axis of the objective lens.

It is therefore an object of this invention to use common optical elements for visual, infrared, and laser sensing.

It is also an object of this invention to use a common eyepiece for observing selectively, a wide or narrow field of view of the same object.

It is yet another object of this invention to cluster a plurality of telescopes.

It is still another object of this invention to boresight an optical system.

It is also an object of this invention to provide adjustable mirror apparatus which is adapted to be used in automatic boresighting of optical systems.

It is also a specific object of this invention to provide a novel gimbal system and mechanism.

BRIEF DESCRIPTION OF THE DRAWINGS

Other objects will become apparent from the following description, taken in connection with the accompanying drawings, in which:

FIG. 2 is a view of one side of a typical apparatus in accordance with this invention;

FIG. 3 is a view of the other side of the apparatus of FIG. 2;

FIG. 3A is a sectional view taken through the center of composite structure 50;

FIG. 4 is a fragmented view of the controllable folding mirror;

DETAILED DESCRIPTION OF THE INVENTION

Figure 1:
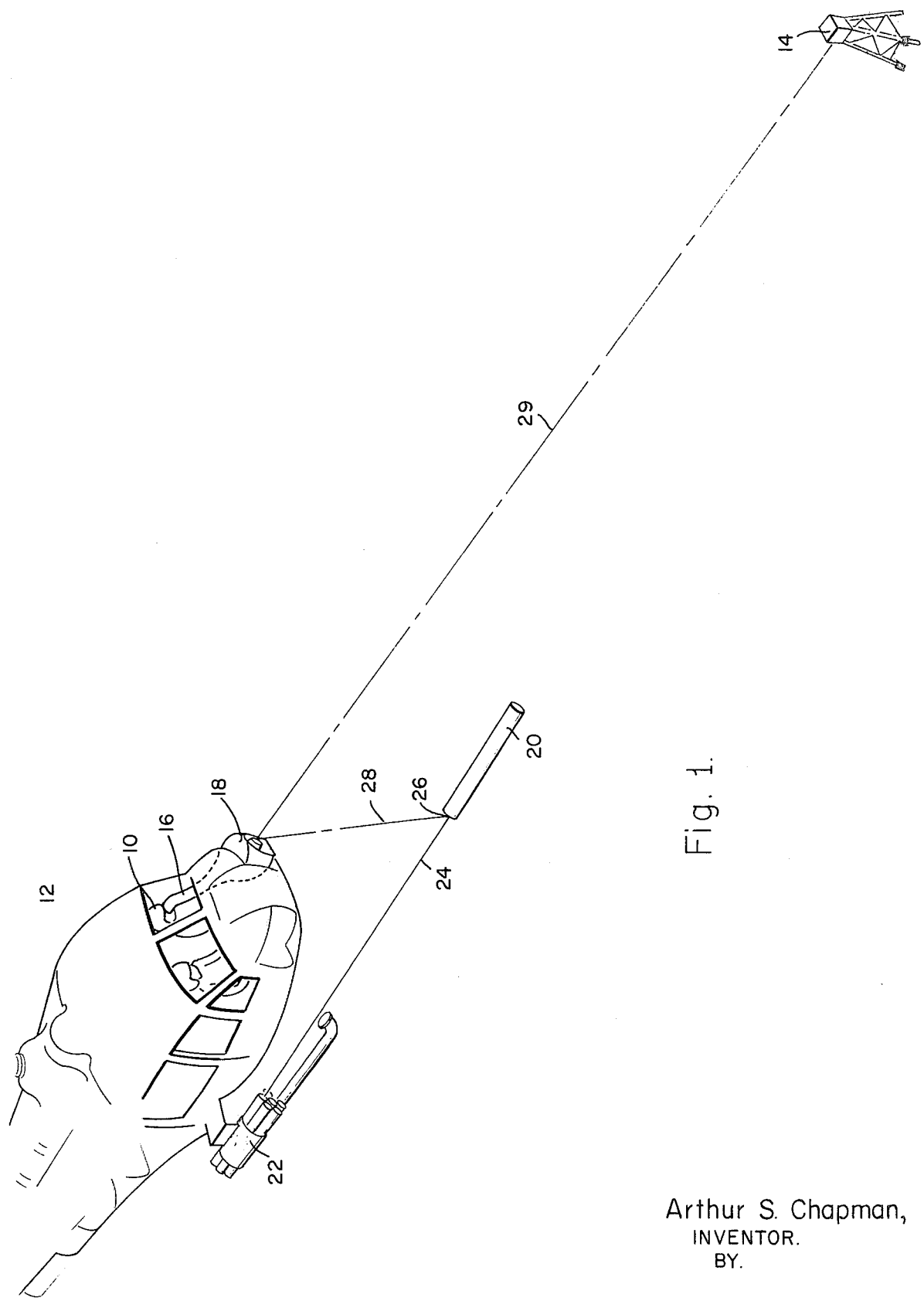
FIG. 1 is a view of a helicopter, a target, a missile, and a typical apparatus of this invention positioned upon the helicopter, showing an operator using the apparatus this invention.

As shown in FIG. 1, a controller 10 seated in a helicopter 12 is observing a target 14, upon the ground, through a set of relay optics 16 and the telescope cluster apparatus 18 of this invention. A missile 20 has been fired from a pod 22 upon the helicopter. A control link for the missile 20, which may be a radio link or a wire cable is shown at 24. Typically, the operator 10 is looking at the target 14 while the infrared portion of the telescope cluster apparatus 18 is looking at the engine glow on the after end 26 of the missile 20, as shown by the dashed line 28.

A typical structure of the apparatus in accordance with this invention is shown in FIGS. 2, 3, and 4. FIGS. 2 and 3 show opposite sides of the apparatus. Referring to FIGS. 2 and 3, a common narrow field of view objective lens 30 is held in a frame 32. Radiation entering the objective lens 30 strikes the folding mirror shown in phantom at 34 in FIG. 3. The folding mirror 34 is shown in phantom because it is in front of the plane of the gear 36. A motor 38 drives the gear 40. The gear 42, attached to gear 40, drives the gear 36, which, in turn, drives the gear 45. Thus, the gears 36 and 45 are driven in synchronism. A resolver 44 is attached to the gears 40 and 42 to generate a reference voltage which is used, together with signals from the infrared detector 46 and an infrared detector (not shown in FIGS. 2 and 3) positioned upon the objective lens 48.

The infrared detector 46 is offset to one side of the principal optical axes of the objective lens 30.

A composite structure 50 is radially positioned interior to the ring of the gear 36 to rotate therewith. The composite member 50 has a pair of substantially parallel faces and is adapted to transmit visual and received laser frequency radiation. Imbedded in the composite structure 50 is a first dichroic mirror 51 (see FIG. 3A), non-parallel to the faces 53 and 55 of the structure 50, which is adapted to reflect received infrared radiation and radiation at the frequency of the boresight laser to be described presently. An aperture 52 is formed in the center of the composite structure 50 and extends through the dichroic mirror 51.

An adjustable mirror 54 is positioned to receive light transmitted through the composite member 50. The angle of the mirror 54 complements the angle of the mirror 34 to cause light to be reflected in the direction of an axis substantially parallel to the principal axis of the objective lens 30 but displaced therefrom, passing through the surface 56 of the multi-faced prism member 58.

The mirror 54 is gimbaled in a ball 60 and socket 62 combination as shown more particularly in FIGS. 2 and 4. The ball 60 is attached to the back of the mirror 54 and has an upstanding post 64 having a small amount of clearance 66 relative to the frame 68. The post 64 is capped with a lock nut 70 after passing through a leaf spring 72 which biases the ball 60 into contact with the socket 62. The mirror 60 is adapted to be turned slightly with respect to the frame 68 about two mutually perpendicular axes against the bias of the spring 72. A pair of arms or push rods 74 and 76 push against the mirror 54 and the ball 60 causing the mirror 54 to tilt. The push rods 74 and 76 are attached to cam followers 78 and 80, respectively. The followers 78 and 80 ride upon the beveled surfaces 82 and 84 of a pair of lead screw followers 86 and 88. The lead screw followers 86 and 88 are positioned upon lead screws 90 and 92 which are driven by motors 94 and 96.

The multi-faced prism 58 is adapted to transmit visual light from face 56, through the prism, in substantially a straight line onto the switching mirror 100. The face of the prism 58, enclosed within the holder 102, has a reticle formed thereon which is shown reflected in the mirror 100 at 104.

A second dichroic mirror 106 is imbedded in the multi-faced prism 58, and it has characteristics whereby visual frequency radiation is transmitted, but laser frequency radiation is reflected. In the embodiment shown, a mirror 108 is imbedded in the multi-faced prism to reflect radiation into the laser sensor 110. Alternatively, a boresight laser, such as a gallium arsenide laser 112 directs light into the face 114 of the multi-faced prism 58 onto the mirror 108 and onto the dichroic mirror 106 which reflects the boresight laser frequency radiation.

In an alternative embodiment of the invention, the mirror 108 is a dichroic mirror which is adapted to reflect the frequencies of the external laser and to transmit frequencies of the boresight laser 112. In the alternative embodiment, the boresight laser 112 is positioned adjacent the face 116 of the multi-faced prism 58. It is understood, of course, that if the dichroic mirror 108 were made to reflect the radiation of the frequency of the boresight and to transmit the frequencies of the external laser, the external laser sensor 110 would be placed adjacent the face 116.

A wide field of view visual telescope 118 is directed substantially along the axis perpendicular to the face 56. A reticle 120 is positioned at the focal point of the telescope 118. The reticle 120 and the reticle on the face of the prism 58, which is reflected in the mirror 104, are equal distance from the pivot axis of the mirror 100, whereby by merely rotating the mirror 100 into a position to reflect the reticle 120, either the broad field of view of telescope 118 or the narrow field of view of the objective lens 30 may rapidly be switched, one to the other, and viewed through the relay optics or an eyepiece 16. A switching magnet 122, having two predetermined positions which position the mirror 100 to reflect either the reticle 104 or the reticle 120 is shown attached to the mirror 100.

The spinning mangin mirror 124 is tilted slightly relative to the principal optical axis of the objective lens 48. The structure and operation of the spinning mangin mirror 124, the objective lens 48, and the crossed sensors 126 are shown, described, and claimed in U.S. Pat. application Ser. No. 19,374, filed Mar. 13, 1970, by Arthur S. Chapman, for a "Balanced Tiltable, Rotating Mirror With Its Optical Axis Angularly Offset From Its Axis Of Rotation," which is assigned to Hughes Aircraft Company, the assignee of this patent application.

Briefly, incoming infrared radiation strikes the mangin mirror 124 which, because its surface is tilted slightly relative to the axis of rotation thereof, causes the image of the source to rotate substantially in a circle on the sensor 126 where the image is focused. The sensor 126 produces a signals in response to the image, and these signals are compared to the signals of the resolver 44, thereby giving an indication electrically of the angle between the line of sight to the infrared source and the principle optical axis of the objective lens 48.

The operation of the apparatus may be observed in connection with the ray drawings of FIGS. 5 through 11. It is to be understood in the FIGS. 5 through 11 that the dashed lines representing the rays do not necessarily mean the rays are pencil rays, or all of the filaments of the rays are parallel. For example, it is known that parallel rays entering the objective lens converge toward a focus at the focal point, but the incoming light is, nevertheless, in these figures represented by a single line which may be considered to represent merely a single filament of the incoming radiation.

Figure 5:
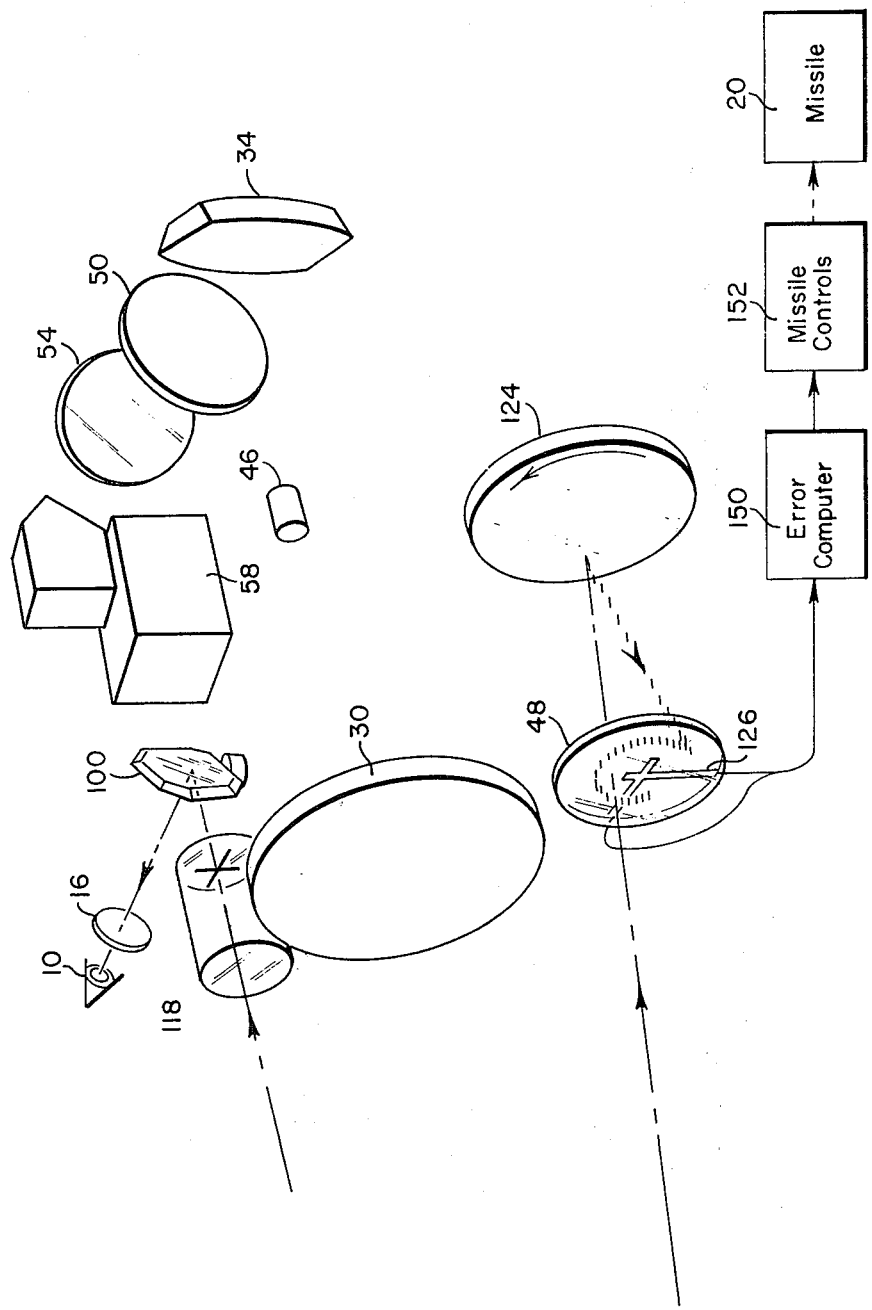
FIG. 5 is a ray diagram showing the light paths of visual radiation through the broadband visual telescope and the path of infrared radiation through the broadband infrared telescope.
Figure 6:
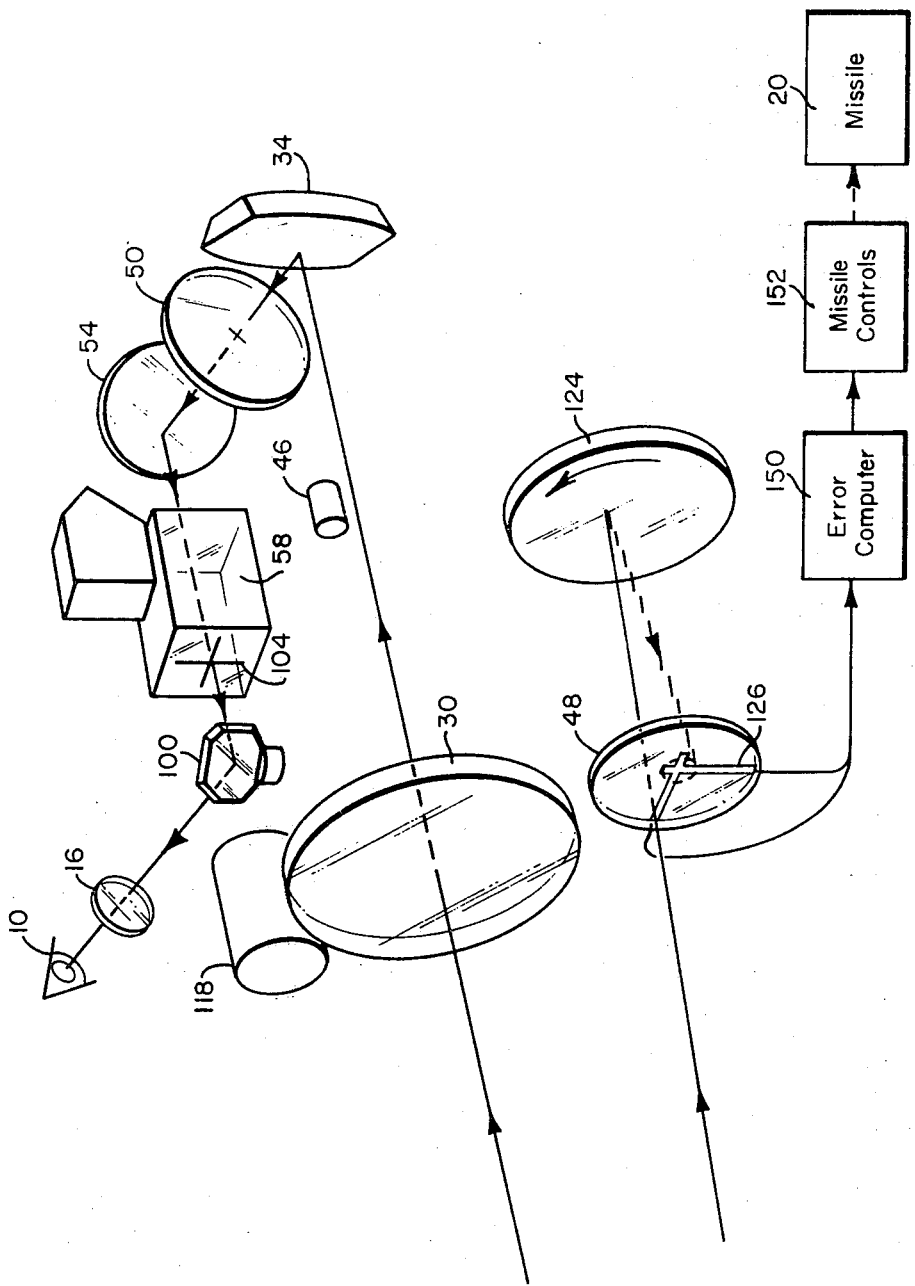
FIG. 6 is a ray diagram showing the direction of the flow of visual radiation through the narrow field of view visual telescope and infrared radiation through the intermediate field of view telescope.

Referring to FIG. 5, the observer 10, through the relay optics 16 and the switching mirror 100 looks through the acquisition telescope 118 to acquire the target. The observer 10 then turns the entire structure upon gimbals (not shown) to align the cross hairs of the reticle 120 on the target. He then switches the switching mirror 100 into the position shown in FIG. 6 to view the narrow field of view visual telescope and align the cross hairs of reticle 104 on the target. When the narrow field of view is used, as it is after the target is acquired, the incoming visible light passes through the objective lens 30 and is focused at the reticle 104. The incoming light is relayed by the folding mirror 34, through the composite structure 50, and by the folding mirror 54, through the multi-faced prism 58, onto the reticle 104. The observer 10, using the relay optics 16, then continues to track the target using the reticle 104 with the switching relay 100 in the position shown in FIG. 6.

At an appropriate time, the operator 10 fires the missile which may, for example, be a missile having a control wire extending back to the helicopter 12. The broad field of view objective lens 48 immediately acquires the hot nozzle of the departing missile. The infrared radiation from the departing missile passes through the objective lens 48, onto the spinning mangin mirror 124 and onto the surface of the objective lens 48 where it is focused. Because of the spinning of the mangin mirror 124 and its slight tilt, the image of the departing missile rotates substantially in a circle, the timing of crossing of the sensors 126 determining the angle between the optical axis of the objective lens 48 and the departing missile. The signals from the sensor 126 are delivered to an error computer 150, which produces signals representative of the deviation of the departing missile from a prescribed course, and delivers those signals to the missile controls 152, which then transmit them to the missile 20, steering the missile toward the target 14.

As the missile proceeds outward toward the target, and as the angle between the arriving infrared radiation from the missile and the optical axis of lens 48 becomes smaller, the error computer 150 begins to use the shorter arms of the sensor 126 for an intermediate sensing of the angle between the optical axis of lens 48 and the direction to the departing missile.

Figure 7:
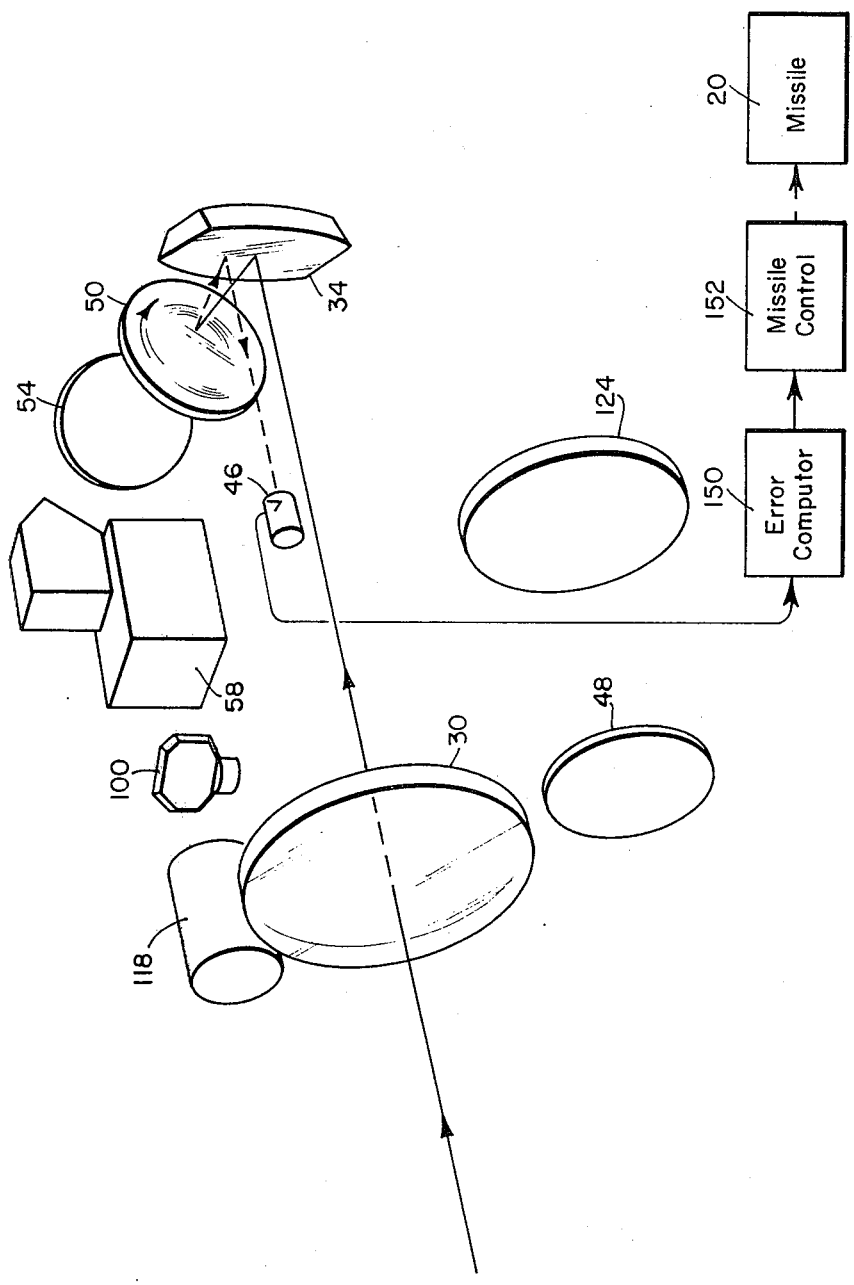
FIG. 7 is a ray diagram showing the light path of infrared radiation through the narrow field of view telescope.
Figure 8:
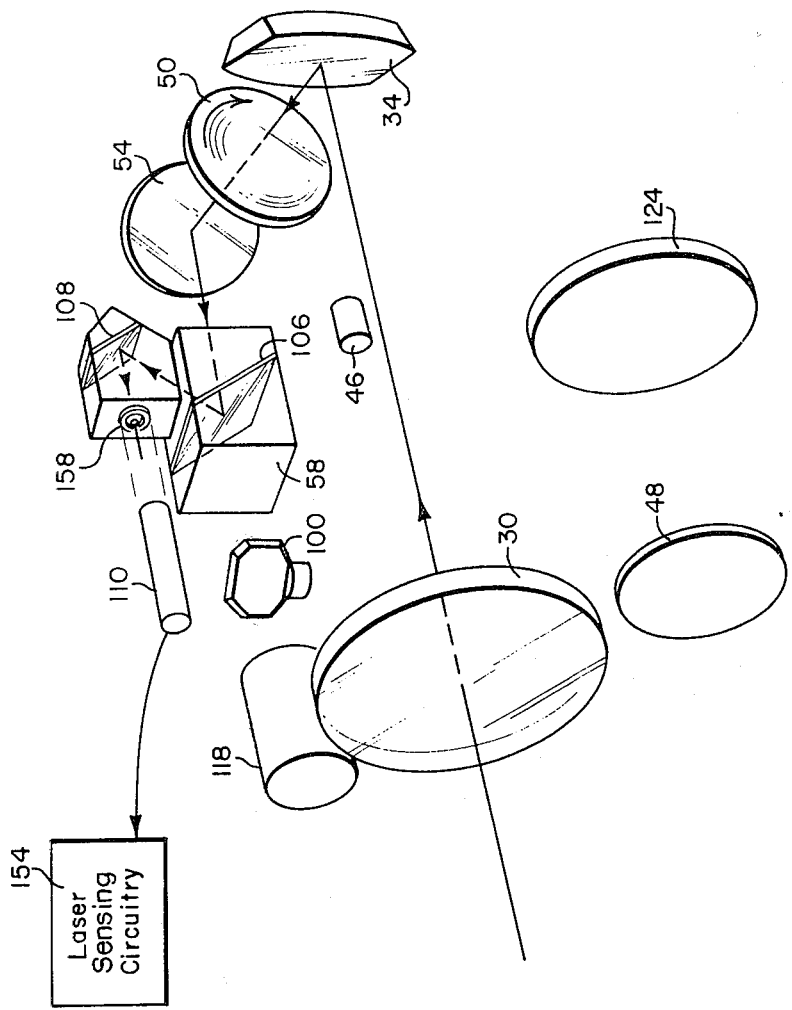
FIG. 8 is a ray diagram showing the light path of incoming received laser radiation in the narrow field of view telescope.

As the departing missile proceeds further along its path, with the optical axis of the objective lens 30 substantially aligned between the helicopter and the target, the departing missile will approach more closely to the line of sight to the target 14. The error computer 150 then switches to the sensor 46 which also has, for example, a pair of crossed sensors similar to that of 126. The narrow field of view objective lens 30 receives the incoming infrared radiation, as shown in FIG. 7, which strikes the folding mirror 34 and the first dichroic mirror 51 in the composite structure 50, which reflects the incoming infrared back onto the folding mirror 34 at an angle to cause it to be directed at the sensor 46 where it is focused. The focused image of the distant departing missile, due to the spinning of the composite structure 50, rotates about the axis of the sensor 46 producing a signal indicative of the amount of off axis angle there is between the axis of the objective lens 30 and the direction to the departing missile. It must be understood, of course, that the scale factor used by the error computer in determining the error is different for the sensor 46 than it is for the sensor 126 because of the narrower field of view of the objective lens 30. When a laser (not shown) is used for ranging, a laser beam is transmitted outward toward the target and is reflected back to be sensed. Both the angle and range of the target may thereby be determined. When an observer, for example on the ground, illuminates the target by a laser, a portion of the laser radiation reflected from the target may be sensed by the apparatus of this invention and the direction of the angle to the target determined. FIG. 8 shows the routing of the incoming external laser radiation, which is sensed by the sensor 110, which delivers a signal to the laser sensing circuitry 154, which then determines the angle or range or both of the incoming laser radiation. The incoming radiation passes through the objective lens 30, is reflected from the folding mirror 34, passes through the composite structure 50 and is reflected from the adjustable folding mirror 54 onto the face 56 of the multi-faced prism 58. The incoming radiation strikes the dichroic mirror 106 from which it is reflected onto the mirror 108. The mirror 108 reflects the light through the field stop 158, where it is focused, into the laser sensor 110.

Figure 9:
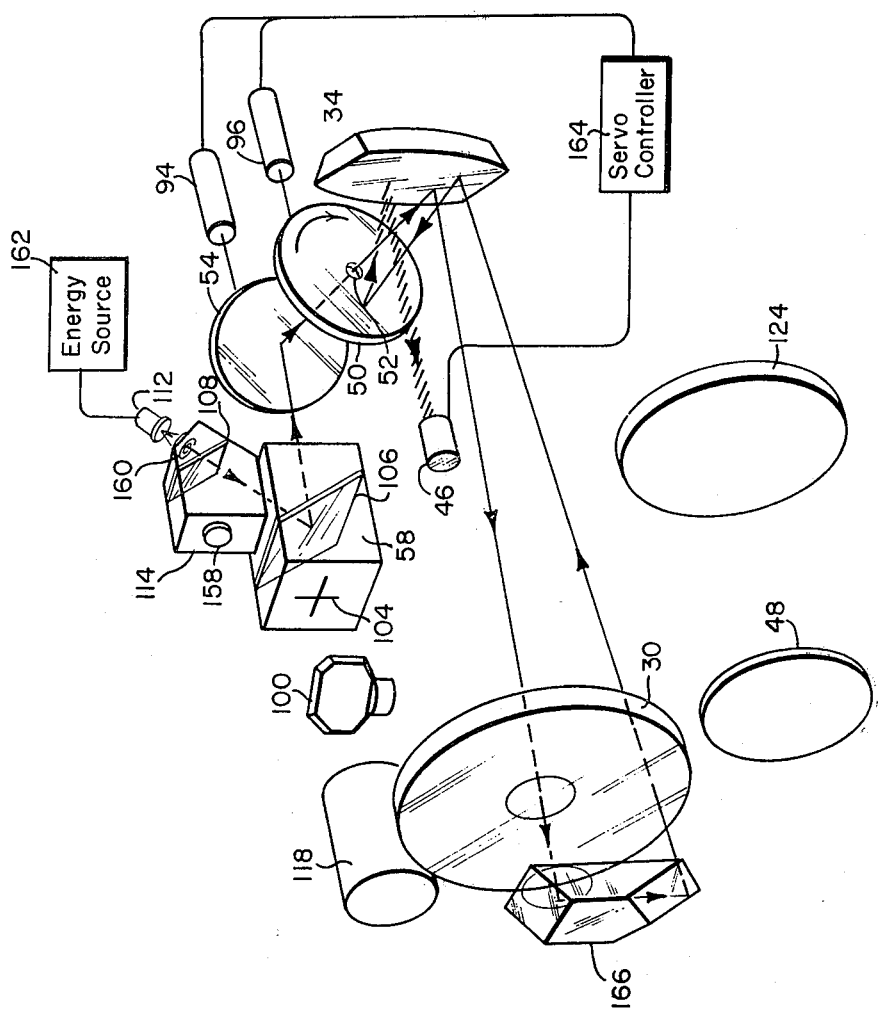
FIG. 9 is a ray diagram showing the light paths for boresighting the narrow field of view telescope using a boresighting laser, and the automatic boresighting adjustment using a servo controller.
Figure 10:
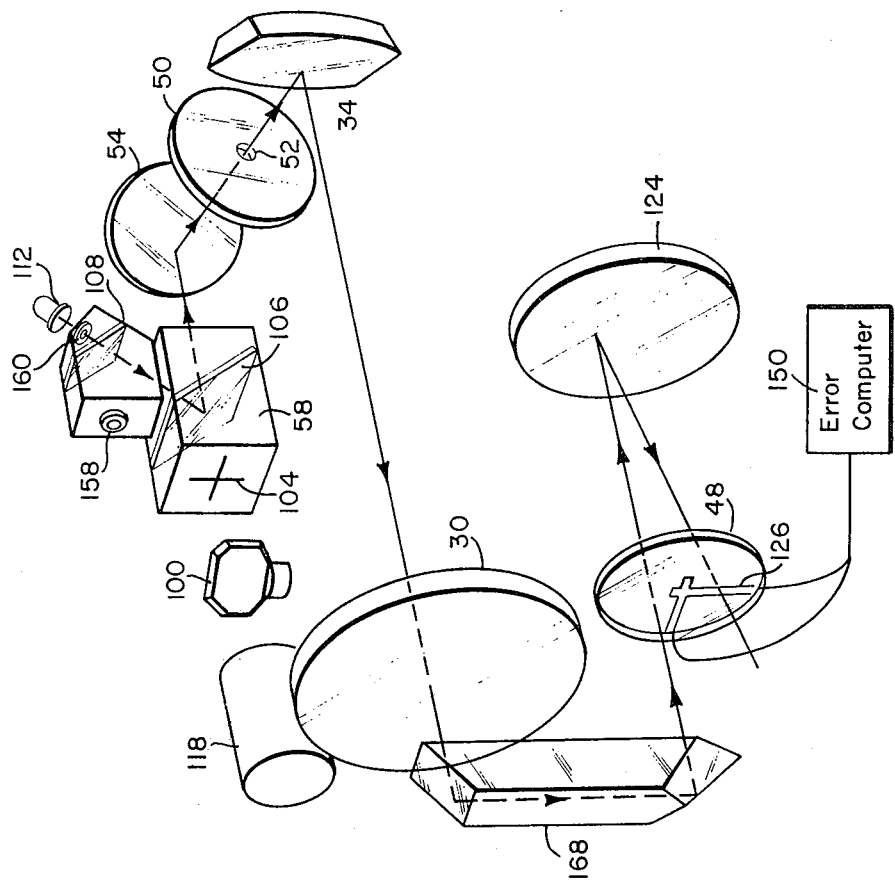
FIG. 10 is a ray diagram showing the light path for boresighting the wide and intermediate field of view infrared telescope with the narrow field of view telescope using a boresighting laser.
Figure 11:
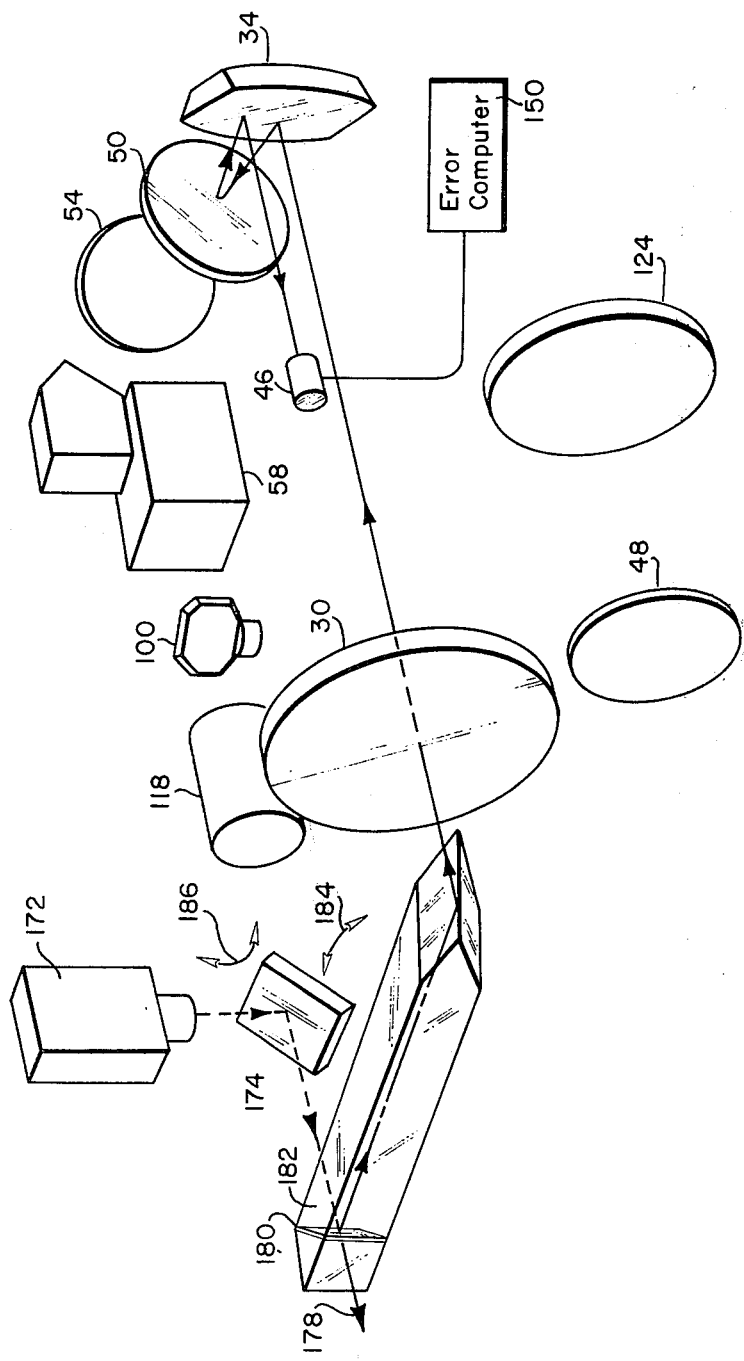
FIG. 11 is a ray diagram showing the light paths for boresighting a laser transmitter with the narrow field of view telescope using a portion of the laser light from the laser transmitter for the boresighting.

When it is desired to boresight the narrow field of view telescope associated with the objective lens 30, the entire apparatus is turned toward a fixed corner reflector 166. The position of the corner reflector 166 within the case is known. For example, a downward elevation angle of 60 degrees may be designated as the required amount to place the corner reflector 166 into position as shown in FIG. 9. A boresight laser 112, receiving energy from an energy source 162 such as power supply, produces radiation of a particular frequency and transmits that radiation through the field stop 160, through the dichroic mirror 108, reflected from the dichroic mirror 106, reflected from the adjustable mirror 54, passing through the aperture 52, thence onto the folding mirror 34 and substantially along the principal axis of the objective lens 30. That is, the radiation will be along the principal axis of the lens 30 when the boresight is completed. The outgoing energy from the lens 30 is delivered to the corner reflector or prism 166 which returns the energy to the objective lens 30 parallel but offset from the impinging energy. The returning energy is reflected from the folding mirror 34 onto the dichroic mirror 51 of the composite structure 50 which reflects back onto the folding mirror 34 and thence into the infrared sensor 46. Because of the spinning of the composite structure 50 and the dichroic mirror 51, the image of the field stop 160, illuminated by energy from the laser 112, rotates about the center of the axis of the infrared sensor 46 and produces a signal indicative of the amount by which the radiation is off center of the objective lens 30. The error signal is delivered to a servo controller 164 which resolves it into two components and delivers command signals to the drive motors 94 and 96, thereby causing the tiltable folding mirror 54 to move in a direction whereby the error signal at the output of sensor 46 is reduced to zero, i.e. when the equipment is completely boresighted.

During boresighting of the narrow field of view telescope associated with the objective lens 30, a portion of the light from the boresight laser radiation from laser 112 through the aperture 52 is diverted by the corner reflector 168 into the objective lens 48 and is reflected from the mangin mirror 124 onto the sensor 126. When the narrow field of view optical telescope is properly boresighted, the light delivered from the corner reflector 168 to the objective lens 48 is parallel to the principle optical axis of the objective lens 30. The error computer 150 then generates a signal indicative of the misalignment of the optical axis of objective lens 48 from the optical axis of the objective lens 30. The signal from the error computer 150 may be adjusted to zero by adjusting the optical axis of the telescope associated with the objective lens 48, or it may be taken into account and used as bias in the various error computers associated with the sensor 126.

When a laser rangefinder 172 is used with the apparatus of this invention, the laser signal is reflected from a folding mirror 174 through a corner reflector 176. The corner reflector 176 is slightly different from that of corner reflectors 168 and 166. Most of the laser light proceeds outward as shown at 178. A portion of the light is reflected at the interface between the transparent block 180 and the member 182. The small amount of reflected light is then channeled to the optical axis of the objective lens 30. When the laser 172 is properly boresighted, the reflected energy from the corner reflector 176 is transmitted through the objective lens 30 onto the folding mirror 34 thence onto the dichroic mirror 51 of the composite structure 50. The dichroic mirror 51 reflects the image of the laser 172 back onto the folding mirror 34 from whence it is delivered to the sensor 46. The sensor 46 produces error signals which are delivered to the error computer 150 which produces a signal indicative of the offset of the angular deviation between the direction of the axis of the laser radiation at 178 and the principal axis of the objective lens 30. The output of the error computer 150 may be used to tilt or turn the folding mirror 178, as indicated by the arrows 184 and 186, to boresight the laser.

Thus, the apparatus of this invention is particularly adapted, in a compact an economical manner, to be used for guiding a departing missile toward a target. It uses common optics wherever feasible and facilitates the boresighting of the various telescopes, particularly by automatically boresighting the narrow field of view telescope.

The gimbal structure for the tiltable mirror 54 provides a simple and easy mechanism for correcting the boresight of the narrow field of view telescope.

Although the invention has been described in detail above, it is not intended that the invention should be limited to that description but only in accordance with that description in combination with the appended claims.

What is claimed is:

1. In combination:
   a telescope objective lens forming at least two corrected images by transmitting radiation at both visible and infrared frequencies in a common optical path;
   an infrared detector positioned to detect a first image formed by said objective lens at infrared frequencies;
   means for observing a second image formed by said objective lens at visible frequencies,
   optical means in said common optical path receiving the radiation transmitted by said objective lens, separating said visible frequency radiation from said infrared frequency radiation and nutating said infrared image without nutating said visible image; and
   said infrared detector having means to detect said nutated infrared image and to provide a measure of an angular relationship between said first and second images with respect to the axis of said common optical path.

2. Apparatus as recited in claim 1 wherein said optical means in said common optical path comprises a plane parallel plate mounted for rotation about a spin axis and having its parallel surfaces positioned to transmit a non-nutated image at visible frequencies, said plate having sandwiched therein a dichroic mirror whose face is tilted relative to said spin axis of said plate, said dichroic mirror being adapted to reflect infrared radiation of a predetermined frequency range to form a nutating image at said infrared detector.

3. Apparatus as recited in claim 1 and further comprising:
   a second wide field of view telescope forming a corrected image by transmitting radiation at visible frequencies and having a principal axis of its objective lens substantially aligned with rays parallel to a principal axis of said first mentioned telescope objective lens and a reticle positioned in the focal plane of said objective lens of said wide field of view telescope;
   a second reticle positioned in the path of radiation transmitted by said dichroic mirror onto a focal plane of said first mentioned objective lens;
   relay optic means; and
   a switching mirror, positioned to relay radiation from said reticle of said wide field of view visual telescope when in one position and said radiation from said second reticle when in a second position.

4. Apparatus as in claim 3 wherein said first objective lens also form a corrected image by transmitting radiation at a preselected laser frequency and further comprising:
   a second dichroic mirror positioned between said first dichroic mirror and said second reticle, angled relative to received radiation, transmitting visual frequency radiation and reflecting infrared and laser frequency radiation into a folded path; and
   a field stop, positioned on said folded path at the focal plane of said first mentioned objective lens.

5. Apparatus as recited in claim 4 and further comprising:
   a third dichroic mirror in said folded path between said second dichroic mirror and said field stop, at an angle relative to the radiation directed along said folded path, for folding selected frequency radiation out of said folded path into a second folded path; and
   a second field stop in said second folded path at the focal plane of said objective lens.

6. Apparatus as in claim 1 wherein said infrared detector is positioned at a focal plane of said objective lens for the peak sensitivity wavelength of said detector and further including folding mirror means for projecting said separated infrared radiation onto said infrared detector.

* * * * *